US012585603B2

(12) United States Patent　　　(10) Patent No.:　US 12,585,603 B2
Takahashi et al.　　　　　　　　　(45) Date of Patent:　Mar. 24, 2026

(54) IMAGING DEVICE

(71) Applicant: Panasonic Intellectual Property Management Co., Ltd., Osaka (JP)

(72) Inventors: Masaya Takahashi, Osaka (JP); Kin Nishikawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 18/814,648

(22) Filed: Aug. 26, 2024

(65) Prior Publication Data

US 2025/0077458 A1　　Mar. 6, 2025

(30) Foreign Application Priority Data

Sep. 5, 2023　(JP) ................................. 2023-143631

(51) Int. Cl.
　G06F 13/40　　　(2006.01)
　G06F 13/42　　　(2006.01)
(52) U.S. Cl.
　CPC ...... G06F 13/4022 (2013.01); G06F 13/4282 (2013.01); G06F 2213/0042 (2013.01)
(58) Field of Classification Search
　CPC ............. G06F 13/4022; G06F 13/4282; G06F 2213/0042
　See application file for complete search history.

(56) References Cited

U.S. PATENT DOCUMENTS

| | | | |
|---|---|---|---|
| 2003/0158977 A1* | 8/2003 | Barrenscheen ..... | G06F 13/4068 710/8 |
| 2017/0220090 A1* | 8/2017 | Kim ...................... | G06F 1/3253 |
| 2017/0344098 A1* | 11/2017 | Abu Hilal ........... | G06F 13/4022 |
| 2018/0067885 A1* | 3/2018 | Hsieh ........................ | G06F 1/22 |
| 2018/0081326 A1 | 3/2018 | Degura | |
| 2020/0333998 A1* | 10/2020 | Lee ......................... | G06F 3/162 |
| 2021/0173453 A1 | 6/2021 | Yamane | |

FOREIGN PATENT DOCUMENTS

| | | |
|---|---|---|
| JP | 2018-045607 A | 3/2018 |
| JP | 2021-092861 A | 6/2021 |

* cited by examiner

*Primary Examiner* — Henry Tsai
*Assistant Examiner* — Harry Z Wang
(74) *Attorney, Agent, or Firm* — Renner, Otto, Boisselle & Sklar, LLP

(57)　　　　　　ABSTRACT
An imaging device including a connector conforming to a predetermined standard is enabled to communicate, via the connector, with an external device not including a communication interface of the predetermined standard. The imaging device includes: a connector conforming to a predetermined standard and having a plurality of terminals including a GND terminal; a first communication unit configured to communicate with a first external device having a communication interface of the predetermined standard when the first external device is connected to the connector; and a second communication unit configured to communicate with a second external device when the second external device configured to perform communication using the GND terminal alone among the plurality of terminals is connected to the connector.

3 Claims, 8 Drawing Sheets

FIG.5 t0 : ALL_SW OFF t1 : SW_A3 ON(Shutter)

t2 : SW_A2 ON(Half Shutter)

t3 : SW_A1 ON (MOVING IMAGE REC)

FIG.7

IMAGING DEVICE

CROSS-REFERENCE TO RELATED APPLICATION

This application claims priority to Japanese patent application No. 2023-143631 filed on Sep. 5, 2023, which is incorporated by reference in its entirety.

BACKGROUND

The present disclosure relates to an imaging device including a connector to which an external device is connected.

Conventionally, in a case of controlling an imaging device by using a wired remote controller, remote controller control has been performed by providing a dedicated terminal.

JP 2018-45607 A discloses an electronic apparatus capable of detecting whether a connected external device is a TYPE-C device or a non-TYPE-C device. The electronic apparatus includes: a first terminal that receives power from an external device; a second terminal that acquires information on power supply capability of the external device; and a determination unit that determines a type of the external device on the basis of an order in which a voltage is applied to the first terminal and the second terminal.

SUMMARY

The present disclosure enables an imaging device including a connector conforming to a predetermined standard to communicate, via the connector, with an external device not including a communication interface of the predetermined standard.

An imaging device according to the present disclosure includes: a connector conforming to a predetermined standard and having a plurality of terminals including first and second ground (GND) terminals; a first communication unit configured to communicate with a first external device having a communication interface of the predetermined standard when the first external device is connected to the connector; and a second communication unit configured to communicate with a second external device configured to perform communication using the first and second GND terminals alone among the plurality of terminals when the second external device is connected to the connector.

The imaging device according to the present disclosure can communicate with an external device that does not have a communication interface of a predetermined standard, via a connector conforming to the predetermined standard.

BRIEF DESCRIPTION OF THE DRAWINGS

FIG. 5 is an operation example of the configuration example of FIG. 4;

FIG. 7 is a configuration example including the imaging device according to the second embodiment.

DETAILED DESCRIPTION

Hereinafter, embodiments will be described in detail with reference to the drawings as appropriate. However, unnecessarily detailed description may be omitted. For example, a detailed description of a well-known matter and a repeated description of substantially the same configuration may be omitted. This is to avoid unnecessary redundancy of the following description and to facilitate understanding by those skilled in the art. It is to be noted that the inventor(s) provides the accompanying drawings and the following description in order to enable those skilled in the art to fully understand the present disclosure, and does not intend to limit the claimed subject matter by them.

First Embodiment

Figure 1:
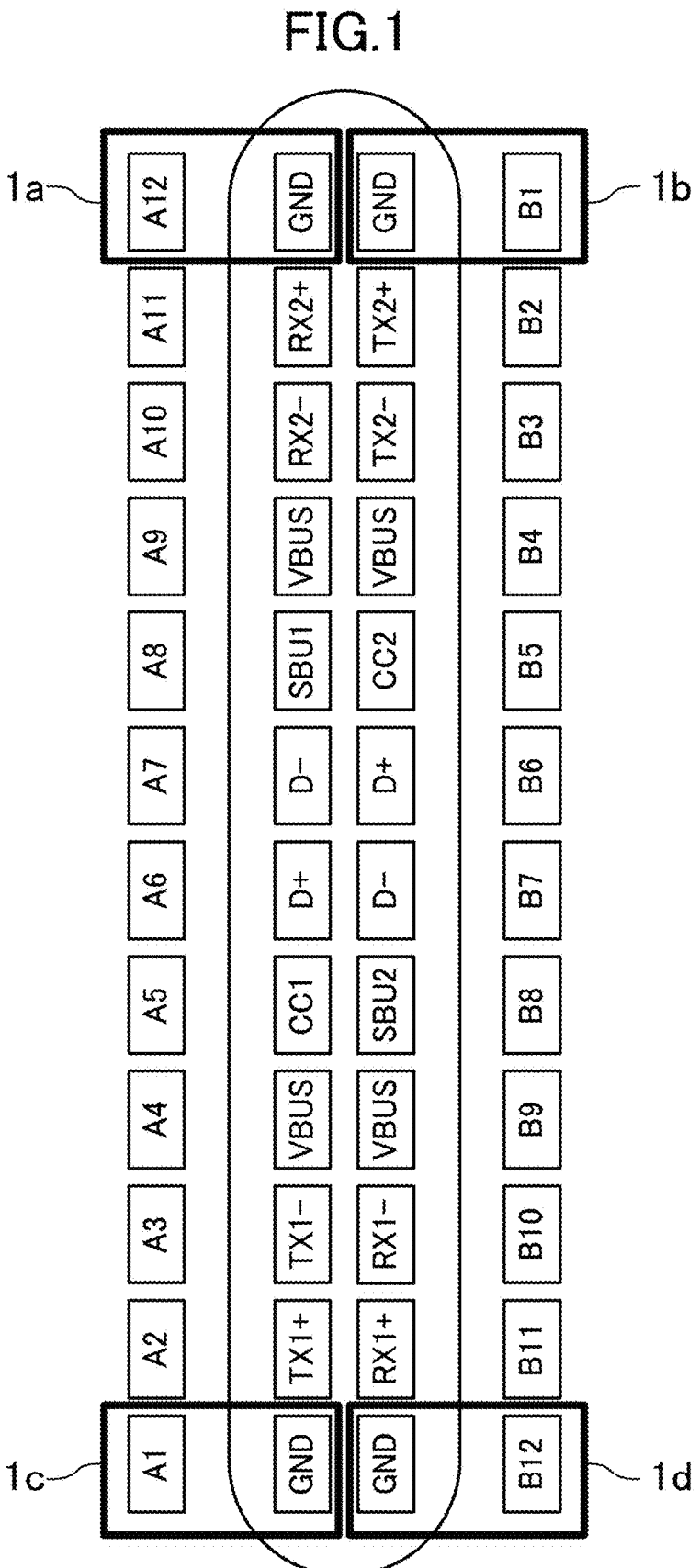
FIG. 1 is an example of a terminal layout of a connector included in an imaging device according to an embodiment.

FIG. 1 is an example of a terminal layout of a connector included in an imaging device according to an embodiment. This connector is a connector of universal serial bus (USB) TYPE-C, and is an example of a connector conforming to a predetermined standard. As illustrated in FIG. 1, in the connector of USB TYPE-C, GND terminals $1a$ and $1b$ are disposed on both sides of one end, and GND terminals $1c$ and $1d$ are disposed on both sides of another end. Other terminals are as described in the USB standard and the like, and a description thereof is omitted here.

When an external device having a communication interface of USB TYPE-C is connected to the connector illustrated in FIG. 1, the imaging device communicates with the external device in accordance with the standard of USB TYPE-C. Furthermore, in the present embodiment, a remote controller that controls an operation of the imaging device can be connected to the connector of FIG. 1. The remote controller does not have a communication interface of USB TYPE-C, and communicates with the imaging device by using the GND terminals $1a$ and $1d$ alone among the plurality of terminals included in the connector. The GND terminals $1a$ and $1d$ are disposed at diagonal positions in the terminal layout. Note that, in the following description, the GND terminals $1a$ and $1d$ are used for communication of the remote controller, and the GND terminals $1b$ and $1c$ are used as GND. However, for example, the GND terminals $1b$ and $1c$ may be used for communication of the remote controller, and the GND terminals $1a$ and $1d$ may be used as GND.

Figure 2:
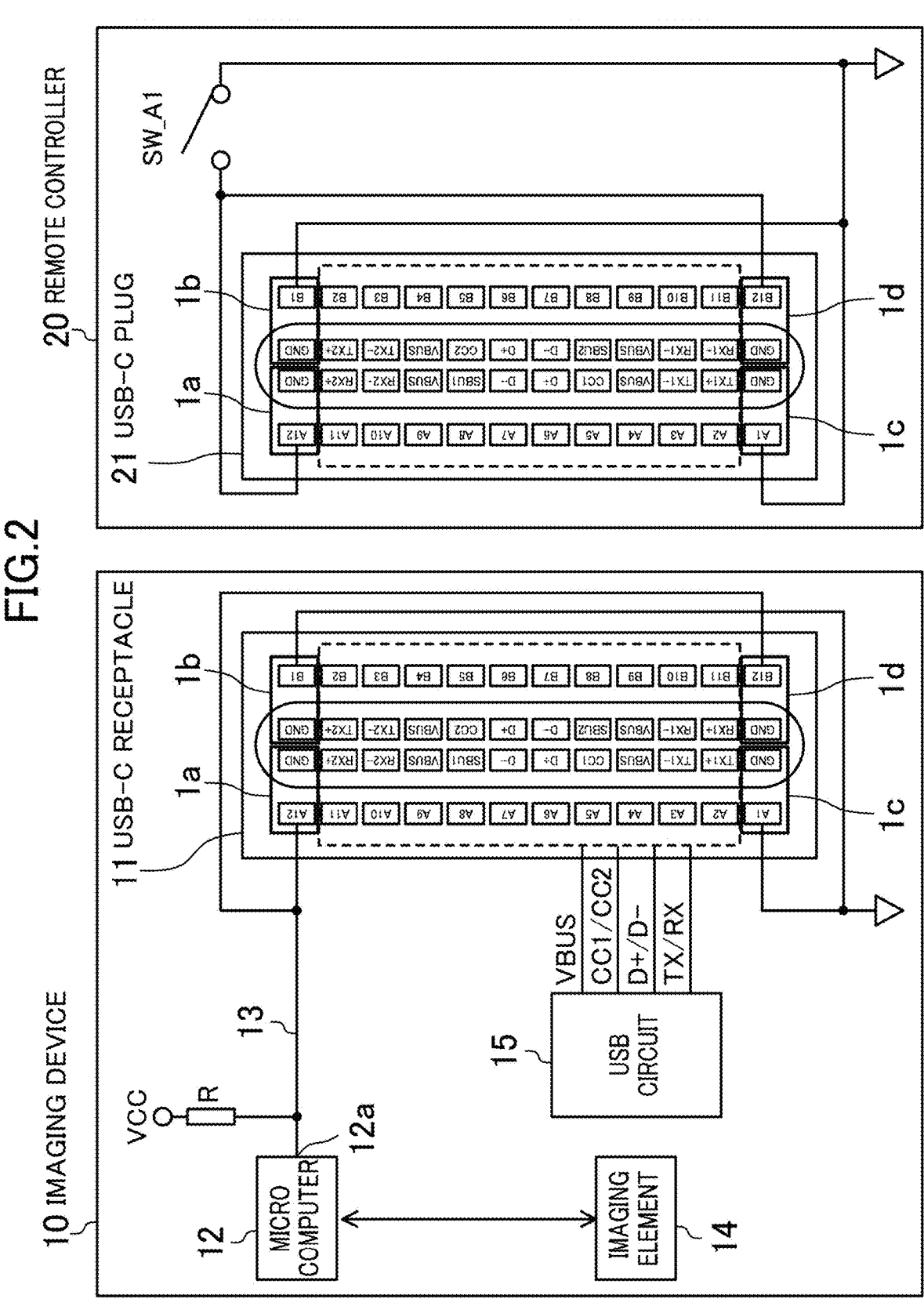
FIG. 2 is a configuration example including the imaging device according to the first embodiment.

FIG. 2 illustrates a configuration example including the imaging device according to the present embodiment. In FIG. 2, an imaging device 10 includes a connector (receptacle) 11 of USB TYPE-C. In the connector 11, the GND terminals $1a$ and $1d$ are connected to a port $12a$ of a microcomputer 12 via a wiring line 13. The wiring line 13 is pulled up to a power supply VCC via a resistance element R. The microcomputer 12 controls an operation of an imaging element 14 in accordance with a voltage of the port $12a$. The microcomputer 12 is an example of a second communication unit in the present disclosure. The GND terminals $1b$ and $1c$ are connected to the ground.

A USB circuit 15 is connected to various pins of the connector 11, and communicates with an external device having a USB TYPE-C communication interface when the external device is connected to the connector 11. The USB circuit 15 is an example of a first communication unit in the present disclosure.

A remote controller 20 includes a connector (plug) 21 of USB TYPE-C and a switch SW_A1 that can be turned ON and OFF from the outside. When the switch SW_A1 is ON, the GND terminals 1a and 1d are electrically connected to the GND terminals 1b and 1c. When the switch SW_A1 is OFF, the GND terminals 1a and 1d are electrically disconnected from the GND terminals 1b and 1c. The GND terminals 1b and 1c are connected to the ground.

Figure 3:
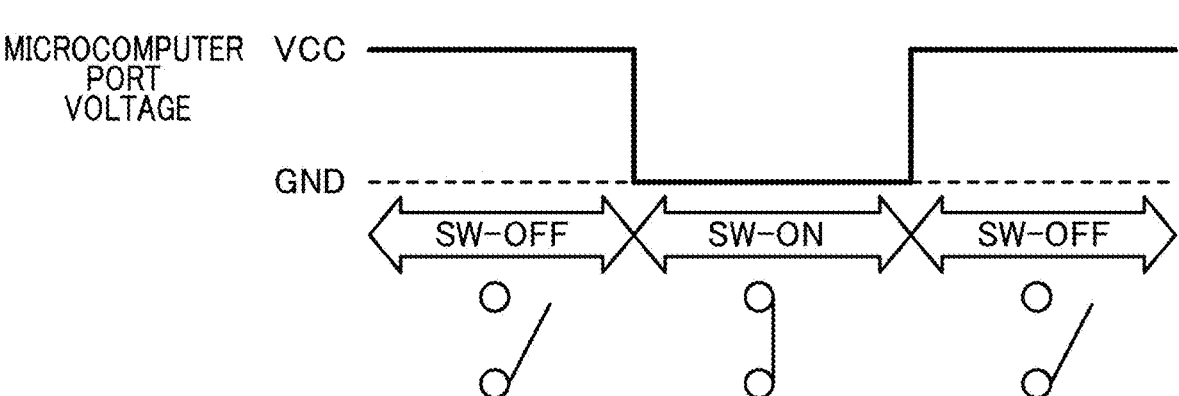
FIG. 3 is an operation example of the configuration example of FIG. 2.

FIG. 3 is a diagram illustrating an operation of the configuration example of FIG. 2, and illustrates a relationship between a voltage of the port 12a of the microcomputer 12 and ON/OFF of the switch SW_A1. As illustrated in FIG. 3, when the switch SW_A1 is OFF, the GND terminals 1a and 1d are electrically disconnected from the GND terminals 1b and 1c, so that the voltage of the port 12a is VCC. Whereas, when the switch SW_A1 is ON, since the GND terminals 1a and 1d are electrically connected to the GND terminals 1b and 1c, the voltage of the port 12a becomes GND. As a result, a control signal can be transmitted from the remote controller 20 to the imaging device 10 by turning ON/OFF the switch SW_A1. Therefore, for example, a shutter operation of the imaging device 10 can be controlled from the remote controller 20.

Figure 4:
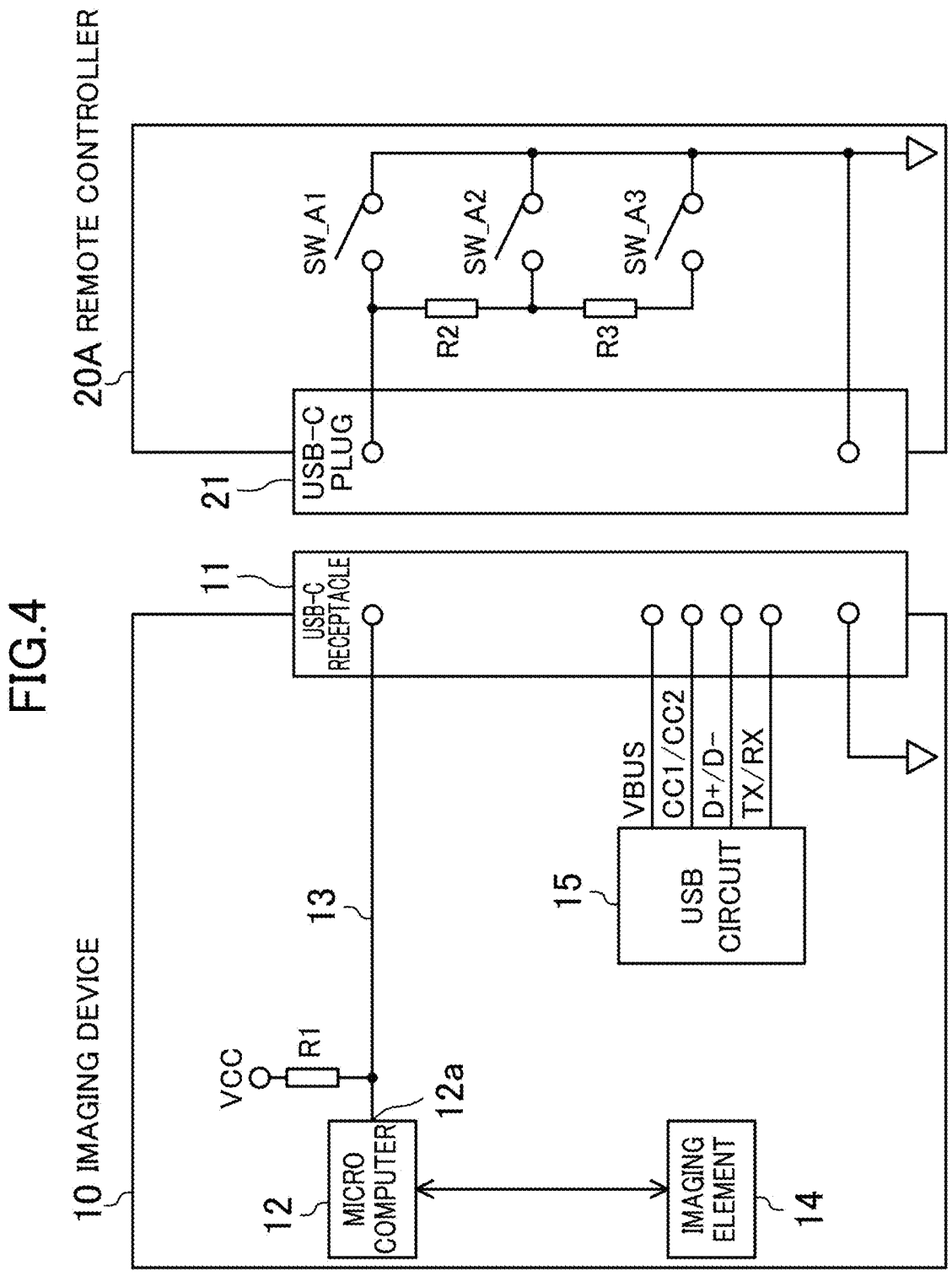
FIG. 4 is another configuration example including the imaging device according to the first embodiment.

FIG. 4 is another configuration example including the imaging device according to the present embodiment. In the configuration of FIG. 4, the configuration of the imaging device 10 is similar to the configuration illustrated in FIG. 2. The wiring line 13 is pulled up to the power supply VCC via a resistance element R1.

A remote controller 20A includes the connector 21 of USB TYPE-C, resistance elements R2 and R3, and switches SW_A1, SW_A2, and SW_A3 that can be turned ON and OFF from the outside. The resistance elements R2 and R3 are connected in series between the GND terminals 1a and 1d and the ground. The switch SW_A1 is provided between the GND terminals 1a and 1d and the ground. The switch SW_A2 is provided between the resistance elements R2 and R3 and the ground. The switch SW_A3 is provided between the resistance element R3 and the ground.

Figure 5:
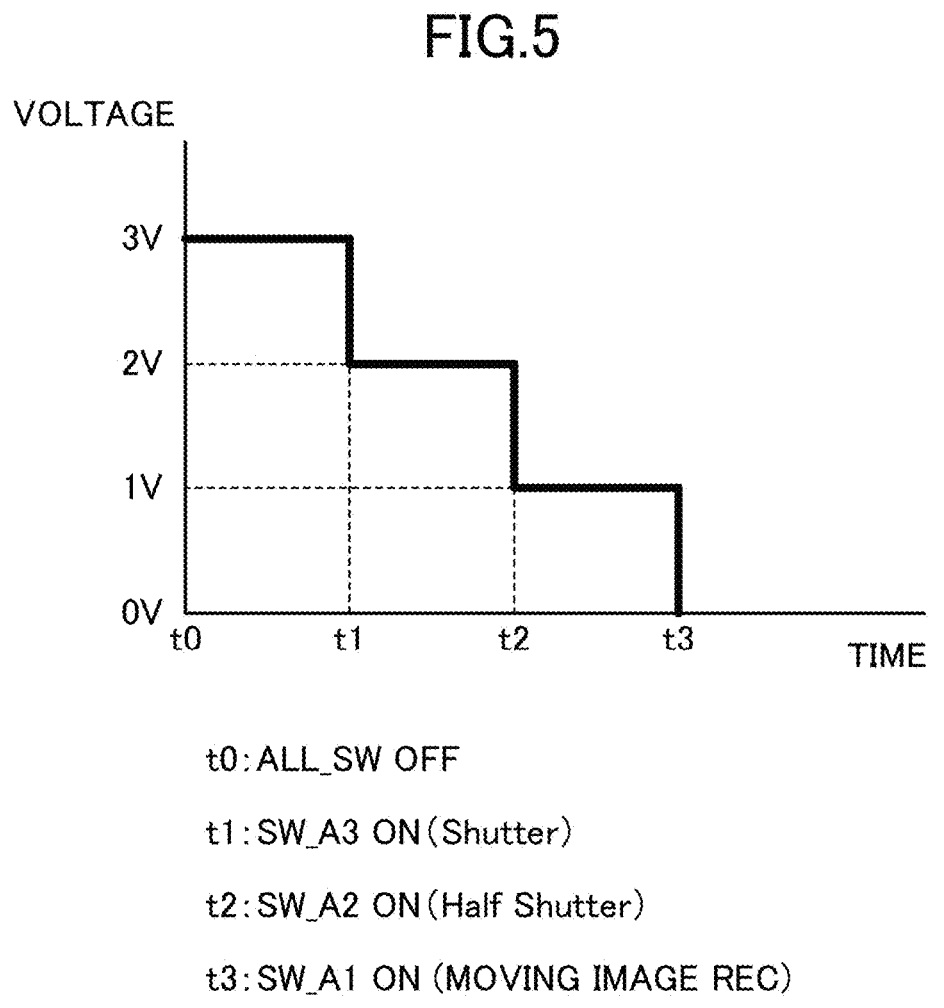

FIG. 5 is a diagram illustrating an operation of the configuration example of FIG. 4, and illustrates a relationship between a voltage of the port 12a of the microcomputer 12 and ON/OFF of the switches SW_A1, SW_A2, and SW_A3. As illustrated in FIG. 5, when all the switches SW_A1, SW_A2, and SW_A3 are OFF (time t0), the voltage of the port 12a is VCC, for example, 3 V. When the switch SW_A3 is turned ON (time t1), the voltage of the port 12a is a voltage obtained by dividing VCC by R1 and (R2+R3), for example, 2 V. When the switch SW_A2 is turned ON (time t2), the voltage of the port 12a is a voltage obtained by dividing VCC by R1 and R2, for example, 1 V. When the switch SW_A1 is turned ON (time t3), the voltage of the port 12a becomes GND (0 V).

As a result, a control signal can be transmitted from the remote controller 20A to the imaging device 10 by turning ON/OFF the switches SW_A1, SW_A2, and SW_A3. Therefore, for example, the operation of the imaging device 10 can be controlled from the remote controller 20A such as a shutter operation by turning ON the switch SW_A1, a half shutter operation by turning ON the switch SW_A2, and a moving image recording operation by turning ON the switch SW_A3.

As described above, according to the present embodiment, the imaging device 10 includes the connector 11 having a USB TYPE-C terminal. The plurality of terminals of the connector 11 include the GND terminals 1a, 1b, 1c, and 1d. When an external device having a communication interface of USB TYPE-C is connected to the connector 11, the USB circuit 15 communicates with the external device. When the remote controllers 20 and 20A that perform communication using the GND terminals 1a and 1d alone are connected to the connector 11, the microcomputer 12 communicates with the remote controllers 20 and 20A.

As a result, the imaging device 10 can communicate with the remote controllers 20 and 20A not having the communication interface of USB TYPE-C, via the connector 11 having the USB TYPE-C terminal. Therefore, remote controller control of the imaging device 10 can be performed without separately providing a dedicated terminal other than the connector 11.

Furthermore, the remote controllers 20 and 20A can send a signal to the imaging device 10 by switching a resistance value between the GND terminals 1a and 1d and the GND terminals 1b and 1c.

Second Embodiment

In a second embodiment, a configuration of an imaging device compatible with USB power delivery (USB PD) will be described. The USB PD is one of power supply standards corresponding to a USB TYPE-C terminal.

Figure 6:
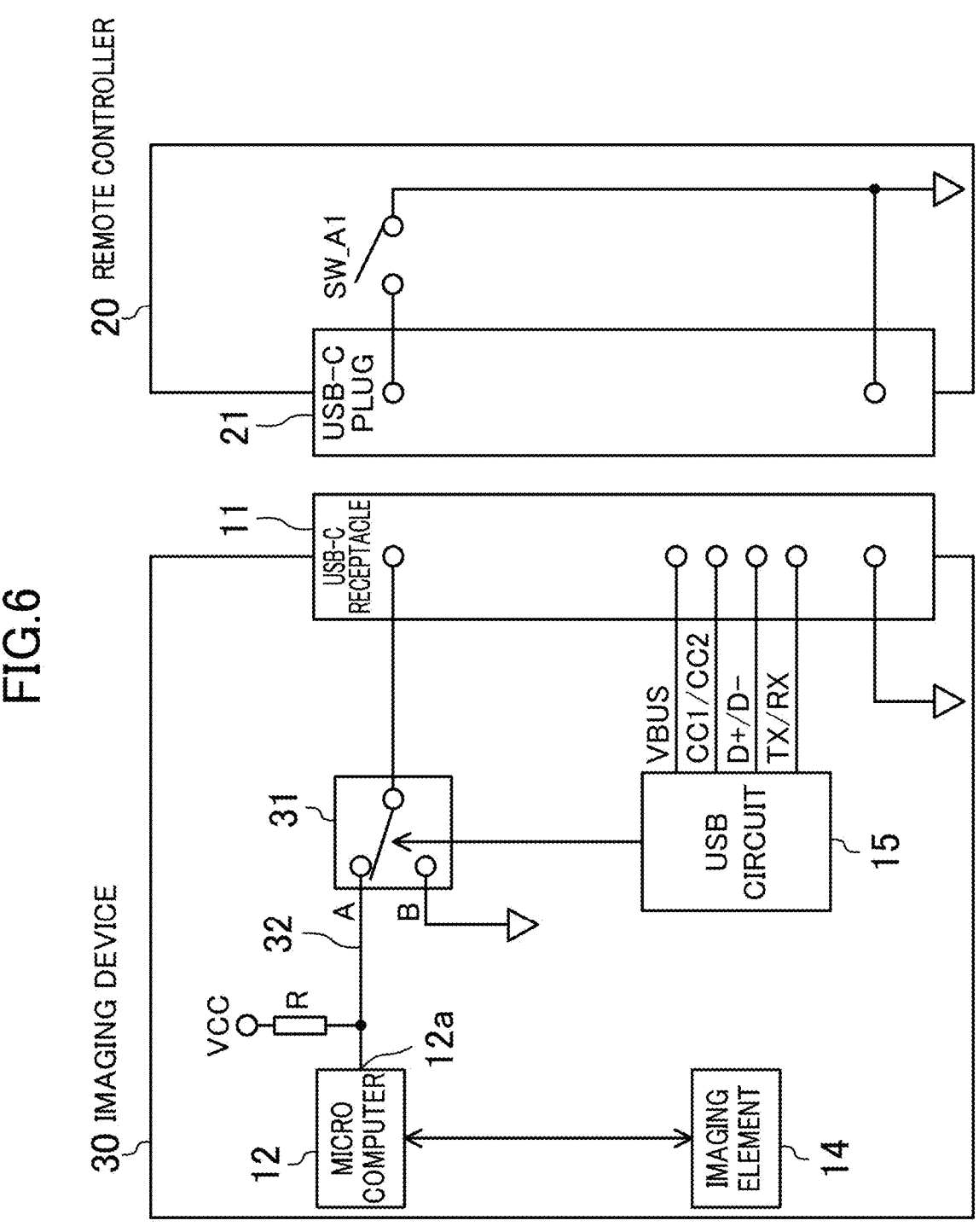
FIG. 6 is a configuration example including an imaging device according to a second embodiment.
Figure 7:
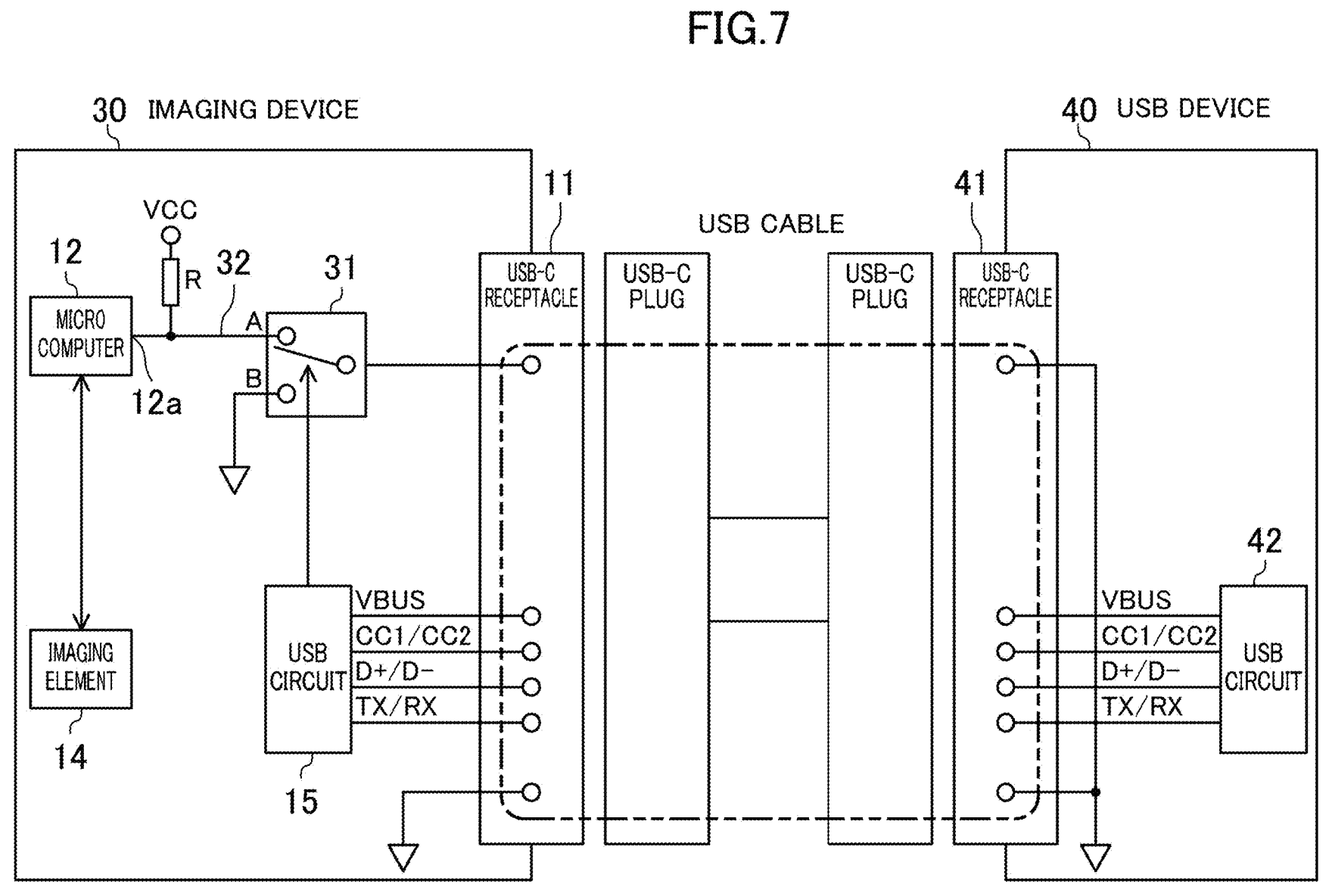

FIGS. 6 and 7 are configuration examples including the imaging device according to the present embodiment. FIG. 6 illustrates a mode in which a remote controller is connected to the imaging device, and FIG. 7 illustrates a mode in which a USB device is connected to the imaging device.

An imaging device 30 further includes a changeover switch 31 in addition to the configuration of the imaging device 10 described in the first embodiment. The changeover switch 31 is configured to be capable of switching a connection destination of the GND terminals 1a and 1d of the connector 11 to a node A or a node B. The node A is connected to the port 12a of the microcomputer 12 via a wiring line 32. The wiring line 32 is pulled up to the power supply VCC via the resistance element R. The node B is connected to the ground.

Switching control of the changeover switch 31 is performed in accordance with a control signal output from the USB circuit 15. The USB circuit 15 includes, for example, a detection IC conforming to the USB-PD standard such as a USB charging IC, and the detection IC detects whether or not the connected device is a USB-PD compatible device. When the USB device is connected to the connector 11, the USB circuit 15 switches the changeover switch 31 to the node B side. Whereas, when an external device other than the USB device is connected to the connector 11, the USB circuit 15 switches the changeover switch 31 to the node A side.

In the mode of FIG. 6, the remote controller 20 shown in the first embodiment is connected to the connector 11 of the imaging device 30. Upon recognizing that an external device other than the USB device is connected to the connector 11, the USB circuit 15 switches the changeover switch 31 to the node A side. As a result, the imaging device 30 can perform an operation similar to that of the imaging device 10 described in the first embodiment. That is, a control signal can be transmitted from the remote controller 20 to the imaging device 30 by turning ON/OFF the switch SW_A1. Therefore, for example, a shutter operation of the imaging device 30 can be controlled from the remote controller 20.

In the mode of FIG. 7, a USB device 40 is connected to the connector 11 of the imaging device 30 via a USB cable. The USB device 40 includes a connector (receptacle) 41 of USB TYPE-C and a USB circuit 42. Upon recognizing that the USB device 40 is connected to the connector 11 through communication with the USB circuit 42, the USB circuit 15 switches the changeover switch 31 to the node B side. Thus, the GND terminals 1*a* and 1*d* of the connector 11 are connected to the ground. Therefore, the imaging device 30 can communicate with the USB device 40 and supply power to the USB device 40 via the connector 11.

As described above, according to the present embodiment, the imaging device 30 includes the connector 11 having the USB TYPE-C terminal. The plurality of terminals of the connector 11 include the GND terminals 1*a*, 1*b*, 1*c*, and 1*d*. The USB circuit 15 communicates with the USB device 40 when the USB device 40 is connected to the connector 11. When the remote controller 20 that performs communication using the GND terminals 1*a* and 1*d* alone is connected to the connector 11, the microcomputer 12 communicates with the remote controller 20.

As a result, the imaging device 30 can communicate with the remote controller 20 not having the communication interface of USB TYPE-C, via the connector 11 having the USB TYPE-C terminal. Therefore, remote controller control of the imaging device 30 can be performed without separately providing a dedicated terminal other than the connector 11.

Furthermore, the imaging device 30 includes the changeover switch 31. The changeover switch 31 connects the GND terminals 1*a* and 1*d* to the microcomputer 12 when the remote controller 20 is connected to the connector 11, and connects the GND terminals 1*a* and 1*d* to the ground when the USB device 40 is connected to the connector 11. As a result, when the USB device 40 is connected to the connector 11, the imaging device 30 can communicate with the USB device 40 and supply power to the USB device 40, and thus can be compatible with USB PD.

In the present embodiment, the remote controller 20 described in the first embodiment may be connected to the imaging device 30. That is, the remote controllers 20 and 20A can send a signal to the imaging device 30 by switching a resistance value between the GND terminals 1*a* and 1*d* and the GND terminals 1*b* and 1*c*.

Other Embodiments

As described above, the above embodiments have been described as examples of the technology disclosed in the present application. However, the technology in the present disclosure is not limited thereto, and can also be applied to embodiments in which changes, replacements, additions, omissions, and the like are made as appropriate. In addition, it is also possible to make a new embodiment by combining components described in the above-described embodiments.

In the first and second embodiments, the remote controller has been described as an example of the external device other than the USB device connected to the USB TYPE-C connector of the imaging device, but the present disclosure is not limited thereto.

Figure 8B:
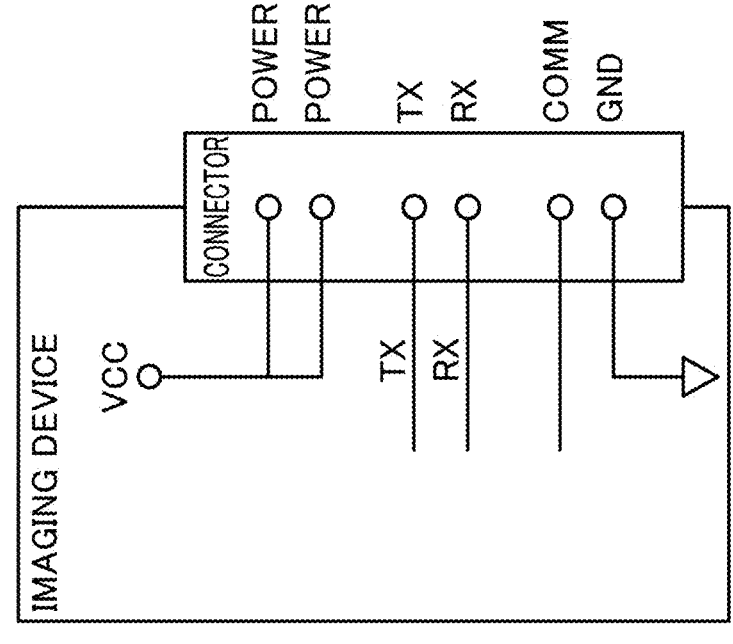
FIGS. 8A and 8B are a use mode of a connector according to another embodiment.
Figure 8A:
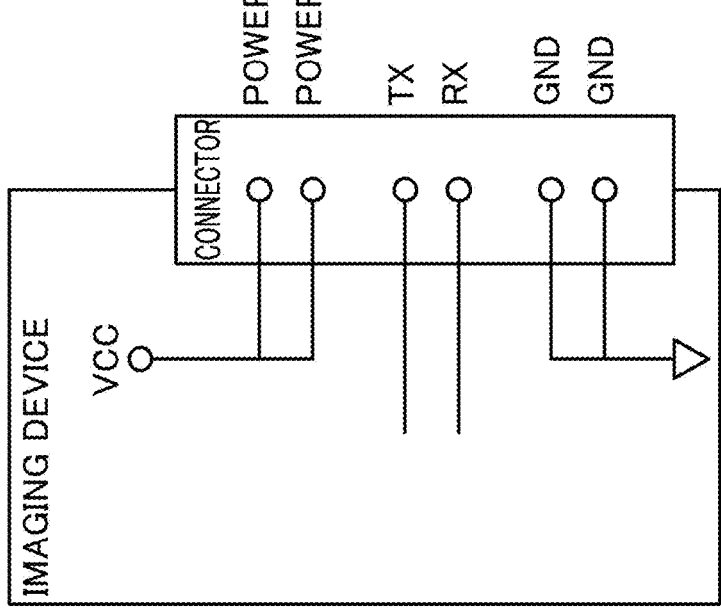

Furthermore, in the first and second embodiments, the connector included in the imaging device has been described as USB TYPE-C, but the present disclosure is not limited thereto. The present disclosure can be applied to any connector that conforms to a predetermined standard and has a plurality of terminals including two or more GND terminals. That is, for the existing communication interface having two or more GND terminals as illustrated in FIG. 8A, as illustrated in FIG. 8B, one GND terminal may be used for another application (COMM), similarly to the above-described embodiment. As a result, a new communication line can be secured without adding a new interface connector to the imaging device.

Functions implemented by components described herein may be implemented in circuitry or processing circuitry, including a general purpose processor, an application specific processor, an integrated circuit, application specific integrated circuits (ASICs), a central processing unit (CPU), a conventional circuit, and/or a combination thereof programmed to implement the described functions. A processor includes a transistor and other circuits, and is regarded as the circuitry or the processing circuitry. The processor may be a programmed processor that executes a program stored in a memory.

In this specification, circuitry, a unit, and an instrument are hardware programmed to implement the described functions or hardware executing the functions. The hardware may be any hardware disclosed herein or any hardware programmed to execute the described functions or known to execute the described functions.

In a case where the hardware is a processor regarded as a type of circuitry, the circuitry, an instrument, or a unit is a combination of hardware and software used to configure the hardware and/or the processor.

As described above, the embodiments have been described as examples of the technology in the present disclosure. For this purpose, the accompanying drawings and the detailed description have been provided.

Accordingly, some of the components described in the accompanying drawings and the detailed description may also include components that are not indispensable for solving the problem in order to exemplify the above technology in addition to indispensable components for solving the problem. Therefore, these components that are not indispensable are not to be immediately recognized to be indispensable on the basis of the fact that these components that are not indispensable are described in the accompanying drawings or detailed description.

In addition, since the above-described embodiments are intended to exemplify the technology in the present disclosure, various changes, replacements, additions, omissions, and the like can be made within the scope of the claims or equivalents thereof.

The present disclosure is applicable to an imaging device including a connector for connecting an external device.

What is claimed is:

1. An imaging device comprising:
   a connector conforming to a predetermined standard and having a plurality of terminals including first and second ground terminals;
   a first communication unit configured to communicate with a first external device having a communication interface of the predetermined standard when the first external device is connected to the connector; and
   a second communication unit configured to communicate with a second external device configured to perform communication using the first and second ground terminals alone among the plurality of terminals when the second external device is connected to the connector, wherein
   the second external device is a remote controller configured to control an operation of the imaging device, and transmits a signal to the imaging device by switching a resistance value between the first ground terminal and the second ground terminal.

2. The imaging device according to claim 1, comprising:

a changeover switch configured to connect the first ground terminal to the second communication unit when the second external device is connected to the connector, and connect the first ground terminal to ground when the first external device is connected to the connector.

3. The imaging device according to claim 2, wherein the connector is a USB TYPE-C connector, and the first ground terminal is two terminals disposed at diagonal positions in a terminal layout.

\*   \*   \*   \*   \*